US012057004B2

(12) United States Patent
Wu

(10) Patent No.: US 12,057,004 B2
(45) Date of Patent: Aug. 6, 2024

(54) WARNINGS DEPENDENT ON LOCATION

(71) Applicant: Nokia Technologies Oy, Espoo (FI)

(72) Inventor: Dawei Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/273,189

(22) PCT Filed: Sep. 17, 2018

(86) PCT No.: PCT/CN2018/106042
§ 371 (c)(1),
(2) Date: Mar. 3, 2021

(87) PCT Pub. No.: WO2020/056557
PCT Pub. Date: Mar. 26, 2020

(65) Prior Publication Data

US 2021/0327251 A1 Oct. 21, 2021

(51) Int. Cl.
*G08B 21/00* (2006.01)
*G08B 21/24* (2006.01)

(52) U.S. Cl.
CPC .................................... *G08B 21/24* (2013.01)

(58) Field of Classification Search
CPC ...................................................... G08B 21/24
(Continued)

(56) References Cited

U.S. PATENT DOCUMENTS 5,557,259 A 9/1996 Musa
5,640,147 A 6/1997 Chek et al.
(Continued)

FOREIGN PATENT DOCUMENTS

CN 1404703 A 3/2003
CN 102726071 A 10/2012
(Continued)

OTHER PUBLICATIONS

"New Canadian Device Could Detect Concealed Weapons With Radar", Digitalslife, Retrieved on Feb. 25, 2021, Webpage available at : https://globalnews.ca/news/3285328/new-canadian-device-could-detect-concealed-weapons-with-radar/.
(Continued)

*Primary Examiner* — Naomi J Small
(74) *Attorney, Agent, or Firm* — ALSTON & BIRD LLP

(57) ABSTRACT

An apparatus (10) comprising: means for determining a current state of each of a first alert module (20_1) and a second alert module (20_2) of a group (22) of alert modules (20), wherein a current state (S_1) of the first alert module (20_1) is dependent upon at least a current location (L_1) of the first alert module (20_1) and a current state (S_2) of the second alert module (20_2) is dependent upon at least a current location (L_2) of the second alert module (20_2); means (30) for providing a first warning signal (W_1) to a first entity (40_1) dependent at least partially on the current state (S_i) of the first alert module (20_1) and/or the second alert module (20_2) of the group (22) of alert modules (20); and means (30) for providing a second warning signal (W_2) to the first entity (40_1) and/or a second entity (40_2) dependent at least partially on the current state (S_i) of the first alert module (20_1) and/or the second alert module (20_2) of the group (22) of alert modules (20).

18 Claims, 4 Drawing Sheets

(58) Field of Classification Search
USPC ........................................................ 340/686.6
See application file for complete search history.

(56) References Cited

U.S. PATENT DOCUMENTS

| | | | |
|---|---|---|---|
| 5,646,593 A | 7/1997 | Hughes et al. | |
| 5,689,240 A | 11/1997 | Traxler | |
| 6,107,928 A * | 8/2000 | Gatti | G08B 13/149 340/568.1 |
| 6,262,660 B1 | 7/2001 | Segale et al. | |
| 6,278,370 B1 | 8/2001 | Underwood | |
| 6,304,186 B1 * | 10/2001 | Rabanne | G08B 21/0216 340/691.3 |
| 6,349,244 B1 * | 2/2002 | Bardin | G06Q 10/087 221/108 |
| 6,791,451 B1 | 9/2004 | Muise et al. | |
| 8,676,377 B2 * | 3/2014 | Siegel | G06Q 10/08 700/244 |
| 8,726,556 B1 | 5/2014 | Willingham | |
| 2002/0080036 A1 | 6/2002 | Rabanne et al. | |
| 2003/0038725 A1 * | 2/2003 | Slomowitz | A47D 7/02 340/686.1 |
| 2004/0066295 A1 | 4/2004 | Fellenstein et al. | |
| 2004/0080420 A1 | 4/2004 | Roberts | |
| 2005/0086133 A1 * | 4/2005 | Scherer | G06Q 10/087 705/28 |
| 2005/0200487 A1 * | 9/2005 | O'Donnell | G08B 21/0227 340/573.1 |
| 2006/0071774 A1 * | 4/2006 | Brown | G07F 9/026 340/522 |
| 2006/0176178 A1 * | 8/2006 | Everest | G08B 21/0202 340/8.1 |
| 2008/0077020 A1 * | 3/2008 | Young | A61B 5/0022 73/726 |
| 2010/0072098 A1 * | 3/2010 | Haber | B02C 18/0007 206/459.1 |
| 2010/0315235 A1 | 12/2010 | Adegoke et al. | |
| 2011/0130945 A1 | 6/2011 | Deedy et al. | |
| 2013/0002413 A1 | 1/2013 | Du et al. | |
| 2013/0002422 A1 * | 1/2013 | Wiese | G08B 13/1654 340/539.1 |
| 2013/0260784 A1 | 10/2013 | Lutz | |
| 2014/0176363 A1 | 6/2014 | Lam et al. | |
| 2014/0201041 A1 * | 7/2014 | Meyer | G01G 19/42 705/28 |
| 2014/0202058 A1 | 7/2014 | Zhou | |
| 2016/0026032 A1 * | 1/2016 | Moore | G02F 1/13452 382/103 |
| 2016/0048798 A1 * | 2/2016 | Meyer | G01G 19/4144 705/28 |
| 2016/0086472 A1 | 3/2016 | Herrera et al. | |
| 2016/0125721 A1 | 5/2016 | Hughes et al. | |
| 2016/0371644 A1 | 12/2016 | Stanarevic et al. | |
| 2017/0241728 A1 | 8/2017 | Stewart et al. | |
| 2018/0058786 A1 | 3/2018 | Carlson | |
| 2018/0068544 A1 | 3/2018 | Caperell | |
| 2018/0114182 A1 * | 4/2018 | Akamatsu | B65G 1/137 |

FOREIGN PATENT DOCUMENTS

| | | |
|---|---|---|
| CN | 102749635 A | 10/2012 |
| CN | 202548898 U | 11/2012 |
| CN | 103310598 A | 9/2013 |
| CN | 104123803 A | 10/2014 |
| CN | 204085314 U | 1/2015 |
| CN | 105989687 A | 10/2016 |
| CN | 106030630 A | 10/2016 |
| WO | 2011/045242 A1 | 4/2011 |

OTHER PUBLICATIONS

"Bluetooth Master/Slave Communications and Sniff/Sniff Sub-Rating Modes", BARB, Bluetooth, Aug. 14, 2008, pp. 1-21.

"iBeaconCalculateDistance", GitHub Gist, Retrieved on Feb. 25, 2021, Webpage available at : https://gist.github.com/JoostKiens/d834d8acd3a6c78324c9.

"Nokia Seeking to Advance Indoor Positioning With In-Location Alliance", Windowscentral, Retrieved on Feb. 25, 2021, Webpage available at : https://www.windowscentral.com/nokia-seeking-advance-progress-indoor-positioning.

"Find My Kids", findmykids.org, Retrieved on Feb. 25, 2021, Webpage available at : https://findmykids.org/en/.

International Search Report and Written Opinion received for corresponding Patent Cooperation Treaty Application No. PCT/CN2018/106042, dated Jun. 17, 2019, 10 pages.

First Examination Report for Indian Application No. 202147017171 dated Feb. 8, 2022, 3 pages.

Office Action for Chinese Application No. 201880097659.X dated Aug. 3, 2022, 20 pages.

Office Action for Chinese Application No. 201880097659.X dated Jun. 27, 2023, 13 pages.

Office Action for Chinese Application No. 201880097659.X dated Apr. 15, 2023, 12 pages.

* cited by examiner

WARNINGS DEPENDENT ON LOCATION

RELATED APPLICATION

This application claims priority to PCT Application No. PCT/CN2018/106042, filed on Sep. 17, 2018, which is incorporated herein by reference in its entirety.

TECHNOLOGICAL FIELD

Embodiments of the present disclosure relate to systems, apparatus, methods, computer programs that cause production of warnings dependent on a current location of an item.

BACKGROUND

Warning systems that produce warnings dependent on a current location of an item are known.

For example, some warning systems may raise an alarm as a consequence of tracking a geographic location of an item and other systems may raise an alarm as a consequence of tracking a relative location of an item compared to another item.

The inventor has realised how a warning system that produces warnings dependent on current location of an item can be improved.

BRIEF SUMMARY

The inventor has realised a warning system that produces a warning dependent on current location of an item and that is more resilient to failure/tampering.

According to various, but not necessarily all, embodiments there is provided an apparatus comprising: means for determining a current state of each of a first alert module and a second alert module of a group of alert modules wherein a current state of the first alert module is dependent upon at least a current location of the first alert module and a current state of the second alert module is dependent upon at least a current location of the second alert module; means for providing a first warning signal to a first entity dependent at least partially on the current state of the first alert module and/or the second alert module of the group of alert modules; and means for providing a second warning signal to the first entity and/or a second entity dependent at least partially on the current state of the first alert module and/or the second alert module of the group of alert modules.

The use of different alert modules, having their own independent locations, in the same apparatus creates redundancy, allowing one or more to continue to operate should one fail or be tampered with. It also enables the failure/tampering to be detected and reported as a warning signal.

According to various, but not necessarily all, embodiments there is provided an apparatus comprising:

means for determining a current state of each of a first alert module and a second alert module of a group of alert modules wherein a current state of the first alert module is dependent upon at least a current location of the first alert module and a current state of the second alert module is dependent upon at least a current location of the second alert module; and means for providing a second warning signal and/or a second warning signal to a first entity and/or a second entity dependent at least partially on the current state of the first alert module and/or the second alert module of the group of alert modules.

In some but not necessarily all examples, the current state of the first and second alert modules are both determined at the first alert module and/or are both determined at the second alert module. In some but not necessarily all examples, the apparatus comprises means for sending and receiving detection signals periodically between the first alert module and the second alert module. In some but not necessarily all examples, the first warning signal is provided in the event that no detection signal is received at the first alert module from the second alert module for more than a first threshold period of time and/or in the event that no detection signal is received at the second alert module from the first alert module for more than a second threshold period of time.

In some but not necessarily all examples, the first warning signal is generated in the event that the current state of the first alert module and/or the second alert module indicates that the first and/or the second alert module is inside a first prohibited geographical area and/or outside a first allowed geographical area.

In some but not necessarily all examples, the second warning signal is generated in the event that the current state of the first alert module and/or the second alert module indicates that the first and/or the second alert module is inside the first prohibited geographical area and/or outside the first allowed geographical area for longer than a third threshold period of time.

In some but not necessarily all examples, the second warning signal is generated in the event that the current state of the first alert module and/or the second alert module indicates that the first and/or the second alert module is inside a second prohibited geographical area and/or outside a second allowed geographical area.

In some but not necessarily all examples, the first alert module and/or the second alert module comprises means for storing information regarding one or more allowed geographical areas and/or one or more prohibited geographical areas.

In some but not necessarily all examples, the first warning signal is provided in the event that a distance change between the first and second alert modules of the group of alert modules is greater than a threshold distance.

In some but not necessarily all examples, the apparatus comprises means for sending a start signal to the first alert module and the second alert module;

means for receiving information of an initial distance between the first alert module and the second alert module;

means for initializing the threshold distance, dependent on the initial distance between the first alert module and the second alert module.

In some but not necessarily all examples, the first entity is a public safety control authority.

In some but not necessarily all examples, the second entity is a user device.

In some but not necessarily all examples, the apparatus comprises:

at least one processor; and at least one memory including computer program code, the at least one memory and the computer program code configured, with the at least one processor, to cause the performance of the apparatus.

According to various, but not necessarily all, embodiments there is provided an apparatus comprising a method comprising: determining a current state of each of a first alert module and a second alert module of a group of alert modules wherein a current state of the first alert module is dependent upon at least a current location of the first alert module and a current state of the second alert module is dependent upon at least a current location of the second alert module; providing a first warning signal to a first entity dependent at least partially on the current state of the first alert module and/or the second alert module of the group of alert modules; and providing a second warning signal to the first entity and/or a second entity dependent at least partially on the current state of the first alert module and/or the second alert module of the group of alert modules.

According to various, but not necessarily all, embodiments there is provided a computer program comprising instructions for causing an apparatus to perform at least the following: determine a current state of each of a first alert module and a second alert module of a group of alert modules wherein a current state of the first alert module is dependent upon at least a current location of the first alert module and a current state of the second alert module is dependent upon at least a current location of the second alert module;

provide a first warning signal to a first entity dependent at least partially on the current state of the first alert module and/or the second alert module of the group of alert modules; and provide a second warning signal to the first entity and/or a second entity dependent at least partially on the current state of the first alert module and/or the second alert module of the group of alert modules.

According to various, but not necessarily all, embodiments there is provided an apparatus comprising: means for determining a current location state of a first alert module of a group of alert modules and a current location state of a second alert module of the group of alert modules; means for providing a warning signal concerning location of the first alert module to a first entity in dependence upon the current location state of the first alert module, means for providing a warning signal to a first entity concerning integrity of the apparatus in dependence upon a change in a relationship between the current location state of the first alert module and the current location state of the second alert module. In some but not necessarily all examples, the apparatus comprises means for providing a warning signal concerning location of the second alert module to the first entity in dependence upon the current location state of the second alert module, According to various, but not necessarily all, embodiments there is provided an apparatus comprising:

means for determining a current location state of at least a first alert module and means for determining a current relationship state of a group of alert modules comprising at least the first alert module and a second alert module of an alert module; means for providing a warning signal concerning location of the first alert module to a first entity in dependence upon the current location state of the first alert module, means for providing a warning signal to the first entity concerning integrity of the group of alert modules in dependence upon a change in a current relationship state of the group of alert modules. In some but not necessarily all examples, the apparatus comprises means for determining a current location state of at least a second alert module and means for providing a warning signal concerning location of the second alert module to the first entity in dependence upon the current location state of the second alert module, According to various, but not necessarily all, embodiments there is provided an apparatus comprising at least one processor; and at least one memory including computer program code, the at least one memory and the computer program code configured, with the at least one processor, to cause the apparatus to perform:

determining a current state of each of a first alert module and a second alert module of a group of alert modules wherein a current state of the first alert module is dependent upon at least a current location of the first alert module and a current state of the second alert module is dependent upon at least a current location of the second alert module; providing a first warning signal to a first entity dependent at least partially on the current state of the first alert module and/or the second alert module of the group of alert modules; and providing a second warning signal to the first entity and/or a second entity dependent at least partially on the current state of the first alert module and/or the second alert module of the group of alert modules.

The term module has physical existence, for example as circuitry independent from other modules or as an apparatus independent of other modules. It is possible for different modules to be located differently. A module apparatus connotes a physical apparatus such as a hardware device or component.

The term entity has physical existence, for example as circuitry independent from other entities or as an apparatus independent of other entities. An entity apparatus connotes a physical apparatus such as a device, system or component.

According to various, but not necessarily all, embodiments there is provided an apparatus comprising at least one processor; and at least one memory including computer program code, the at least one memory and the computer program code configured, with the at least one processor, to cause the apparatus to perform:

determining a current state of each of a first alert module apparatus and a second alert module apparatus of a group of alert module apparatuses wherein a current state of the first alert module apparatus is dependent upon at least a current location of the first alert module apparatus and a current state of the second alert module apparatus is dependent upon at least a current location of the second alert module apparatus; providing a first warning signal to a first entity apparatus, different to the alert module apparatuses, dependent at least partially on the current state of the first alert module apparatus and/or the second alert module apparatus of the group of alert module apparatuses; and providing a second warning signal to the first entity apparatus and/or a second entity apparatus, different to the first entity apparatus and different to the alert module apparatuses, dependent at least partially on the current state of the first alert module apparatus and/or the second alert module apparatus of the group of alert module apparatuses.

According to various, but not necessarily all, embodiments there is provided an apparatus comprising at least one processor; and at least one memory including computer program code, the at least one memory and the computer program code configured, with the at least one processor, to cause the apparatus to perform:

determining a current state of each of a first alert means and a second alert means of a group of alert means, wherein a current state of the first alert means is dependent upon at least a current location of the first alert means and a current state of the second alert means is dependent upon at least a current location of the second alert means; providing a first warning signal to a first warning signal receiver means, different to the alert means, dependent at least partially on the current state of the first alert means and/or the second alert means of the group of alert means; and providing a second warning signal to the first warning signal receiver means and/or a second warning signal receiver means, different to the first warning signal receiver means and different to the alert means, dependent at least partially on the current state of the first alert means and/or the second alert means of the group of alert means.

According to various, but not necessarily all, embodiments there is provided examples as claimed in the appended claims.

BRIEF DESCRIPTION

Some example embodiments will now be described with reference to the accompanying drawings in which.

DETAILED DESCRIPTION

Figure 1:
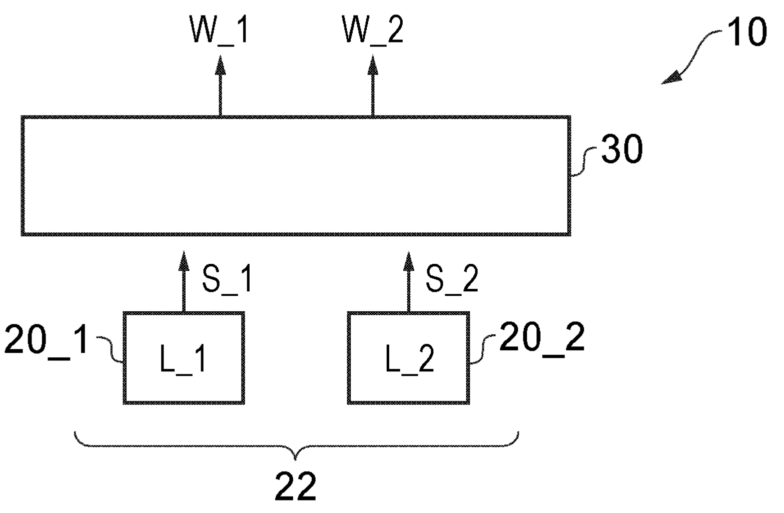
FIG. 1 shows an example embodiment of the subject matter described herein.

FIG. 1 illustrates an example of an apparatus 10 that produces warnings dependent on a current location of an item.

The apparatus 10 comprises:

means for determining a current state S_i of each of a first alert module 20_1 and a second alert module 20_2 of a group 22 of alert modules 20, wherein a current state S_1 of the first alert module 20_1 is dependent upon at least a current location L_1 of the first alert module 20_1 and a current state S_2 of the second alert module 20_2 is dependent upon at least a current location L_2 of the second alert module 20_2;

means 30 for providing a first warning signal W_1 dependent at least partially on the current state S_i of the first alert module 20_1 and/or the second alert module 20_2 of the group 22 of alert modules; and means 30 for providing a second warning signal W_2 dependent at least partially on the current state S_i of the first alert module 20_1 and/or the second alert module 20_2 of the group 22 of alert modules.

In this particular example the apparatus 10 comprises a first alert module 20_1, a second alert module 20_2 and a warning signal generator 30.

The first alert module 20_1 determines a current state S_1 of the first alert module 20_1. This current state S_1 is dependent upon a current location L_1 of the first alert module 20_1. In this example, the current location L_1 is determined by the first alert module 20_1. The location of the first alert module 20_1 may be determined by any suitable mechanism with a resolution that is determined by the accuracy required by the application. For example, the location may be an absolute location determined using satellite positioning or some other method or a relative location determined by communicating with another alert module or a reference.

The second alert module 20_2 determines a current state S_2 of the second alert module 20_2. This current state S_2 is dependent upon a current location L_2 of the second alert module 202. In this example, the current location L_2 is determined by the second alert module 202. The location of the second alert module 20_2 may be determined by any suitable mechanism with a resolution that is determined by the accuracy required by the application. For example, the location may be an absolute location determined using satellite positioning or some other method or a relative location determined by communicating with another alert module or a reference.

The first alert module 20_1 provides the determined current state S_1 of the first alert module 20_1 to the warning signal generator 30. The second alert module 20_2 provides the current state S_2 of the second alert module 20_2 to the warning signal generator 30. The warning signal generator 30 is configured to process the current states {S_i} of the alert modules 20 and to produce warning signals W.

Each warning signal W_i is dependent at least partially on the current state S_1 of the first alert module 20_1 and/or the current state S_2 of the second alert module 20_2. Each warning signal W_i is dependent only upon the current state of the alert modules 20 that are part of a defined group 22 of alert modules 20.

In this example it should be realized that although the group 22 of alert modules 20 comprises only the first alert module 20_1 and the second alert module 20_2, in other examples there may be additional alert modules 20_*i*.

Although in this example all of the alert modules 20 illustrated are part of the group 22, in other examples there may be alert modules 20 that do not form part of the group 22 and they may, for example, form part of a different group of alert modules 20.

In the example illustrated the current states S_i are determined by the alert modules 20_*i* and are provided to the warning signal generator 30. However, in other examples, the alert modules 20_$i_i$ may provide the current locations L_i of the alert modules and the determination of the current state S_i of a particular alert module 20_*i* may be determined by the warning signal generator 30.

In this example a single warning signal generator 30 is shared by the first alert module 20_1 and the second alert module 20_2. In other examples, an independent first warning signal generator 30 may be associated with the first alert module 20_1 and a different, independent second warning signal generator 30 may be associated with the second alert module 20_2.

In some, but not necessarily all examples, the first warning signal generator 30 may be located within the first alert module 20_1 to produce the first warning signal W_1 and the second warning signal W_2 from the first alert module 20_1 and, in addition, a second warning signal generator 30 may be within the second alert module 20_2 and configured to produce the first warning signal W_1 and the second warning signal W_2 from the second alert module 20_2.

The first alert module 20_1 and the second alert module 20_2 are, preferably, independent modules in that they are physically separated, operate independently and they have separate components such as processors, memories, transceivers, power supplies. The first alert module 20_1 and the second alert module 20_2 can, for example, have no common (shared) components.

Figure 2:
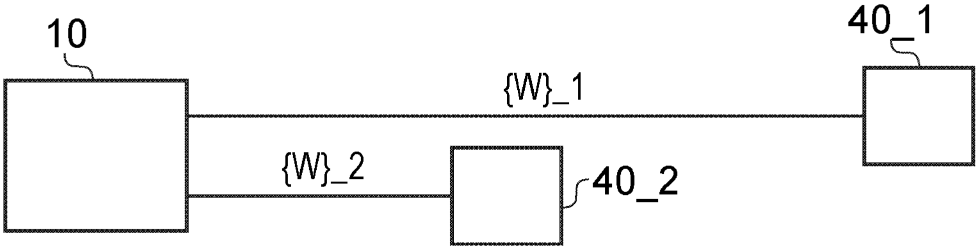
FIG. 2 shows another example embodiment of the subject matter described herein.

FIG. 2 is an example of a warning system 100 comprising the apparatus 10, a first entity 40_1 and a second entity 40_2. In some, but not necessarily all examples, the first entity 40_1 is a remote entity that is connected to the apparatus 10 via, for example, a Wide Area Network (WAN) and the second entity 40_2 is a local entity that is connected to the apparatus via, for example, a Local Area Network (LAN).

In some, but not necessarily all examples, the apparatus 10 may be a firearm (for example a handgun), a drone, hazardous goods, or any other item that may be susceptible to theft or to tampering, such as an in-situ manhole cover.

The first entity 40_1 can, in some, but not necessarily all examples, be an entity that is controlled by a public safety control authority. A public safety control authority is an authority that has responsibility for public safety such as an emergency service, intelligence service, homeland security services, private security service, border control etc.

The second entity 40_2 is, in some, but not necessarily all examples, a user device that is carried or worn by a user such as a mobile phone, a wearable electronic device etc. The user may be the owner or responsible keeper of the apparatus 10.

In some, but not necessarily all examples, it is possible for the second entity 40_2 to be an integral part of the apparatus 10.

FIG. 2 illustrates that any of a first set of warning signals {W}_1, comprising one or more of the warning signals W_i, can be transmitted from the apparatus 10 to the first entity 40_1. Any of a second set of warning signals {W}_2, comprising one or more of the warning signals W_i, can be transmitted from the apparatus 10 to the second entity 40_2. Each warning signal W_i is dependent at least partially on the current states {S_i} of the alert modules 20_*i*.

For example, the apparatus 10 provides the first warning signal W_1 dependent at least partially upon the current state S_1 of the first alert module 20_1 and/or the current state S_2 of the second alert module 20_2 of the group 22 of alert modules to the first entity 40_1 and/or the second entity 40_2.

For example, the apparatus 10 provides the second warning signal W_2 dependent at least partially upon the current state S_1 of the first alert module 20_1 and/or the current state S_2 of the second alert module 20_2 of the group 22 of alert modules to the first entity 40_1 and/or the second entity 40_2.

Figure 3:
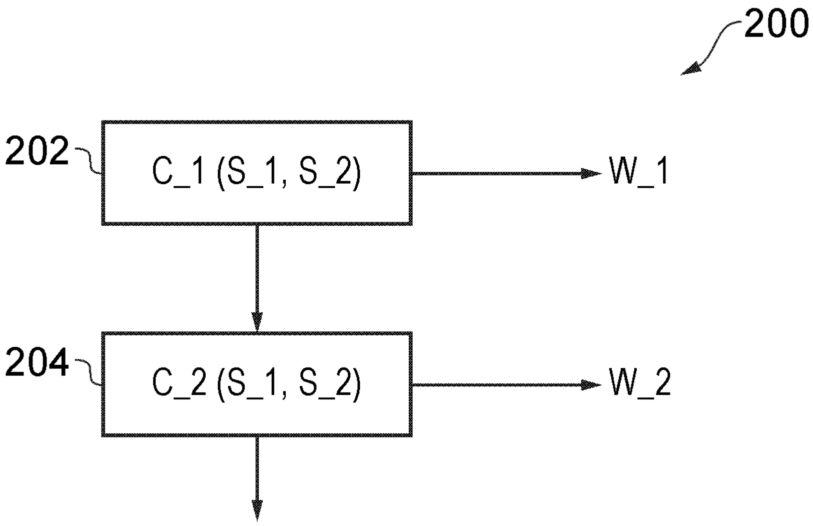
FIG. 3 shows another example embodiment of the subject matter described herein.

FIG. 3 illustrates an example of a method 200 that may be used to provide the first warning signal W_1 and/or the second warning signal W_2. The figure illustrates how the first warning signal W_1 is dependent at least partially on the current states S_1, 5_2 of the first alert module 20_1 and/or the second alert module 20_2 and how the second warning signal W_2 is dependent at least partially on the current states S_1, S_2 of the first alert module 20_1 and/or the second alert module 20_2.

The warning signal generator 30 executes the method 200. The current states {S_i} of the alert modules 20_*i* of the defined group 22 of alert modules have, in this example, been provided by the first alert module 20_1 and the second alert module 20_2.

At block 202, a first condition C_1, which is defined in terms of the current states {S_i} of the alert modules 20_*i* of the group 22, is used to conditionally produce the first warning signal W_1. It will be appreciated that in some examples the first warning signal W_1 may be produced when the first condition is satisfied whereas in a different implementation the first warning signal W_1 may be produced when the first condition is not satisfied.

Then the method moves to block 204 and considers a second condition C_2. The second condition C_2 is a different condition to the first condition C_1 but, like the second condition C_2 is defined in terms of the current states {S_i} of the alert modules 20_*i* of the group 22. The second condition C_2 is used to conditionally produce the second warning signal W_2. It will be appreciated that in some examples the second warning signal W_2 may be produced when the second condition is satisfied whereas in a different implementation the second warning signal W_2 may be produced when the second condition is not satisfied.

It will be appreciated that the method 200 can continue to consider additional conditions C_i and produce other warning signals W_i.

Figure 4:
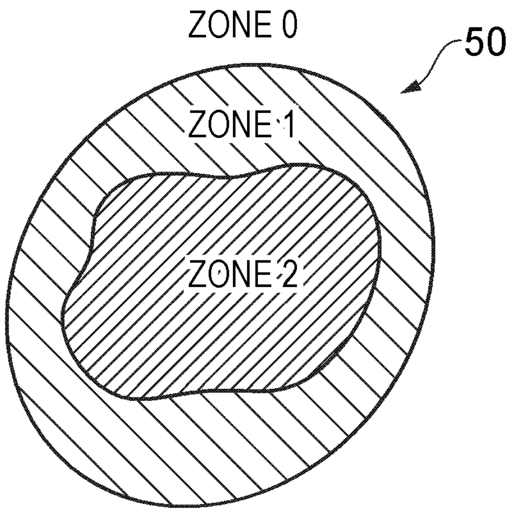
FIG. 4 shows another example embodiment of the subject matter described herein.

FIG. 4 illustrates an example in which absolute location of an alert module 20 is used as a condition for producing a warning signal W. In the example illustrated there are three different zones, zone 0, zone 1 and zone 2. In other examples there may only be zone 0 and zone 2.

Each of these zones represents a different geographic area within a real space 50. For example, zone 0 may be in a large geographic area in which the alert module is allowed to be located. In this scenario, when the alert module is located in zone 0 a warning signal based on absolute location is not produced. Continuing this example, zone 2 may be a prohibited geographic area in which the alert module 20 (apparatus 10) is not allowed to be located. If the alert module 20 is located in zone 2 then a warning signal W_1 is produced. Zone 1 is a zone that is intermediate between the large geographical area of zone 0 and the prohibited geographical area of zone 2. This may be considered to be a warning zone. While the alert module 20 is allowed to be located within the warning zone, a warning signal W_2 is produced to warn of the proximity of the prohibited geographical area of zone 2.

Figure 5:
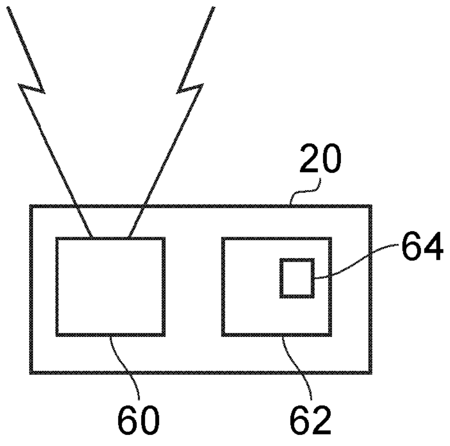
FIG. 5 shows another example embodiment of the subject matter described herein.

FIG. 5 illustrates an example of an alert module 20 that is suitable for performing the example method described with reference to FIG. 4. In this example the alert module 20 comprises location circuitry 60 that is configured to provide an absolute location of the host alert module 20. This location circuitry 60 may, for example, be a satellite positioning receiver. In this example, the alert module 20 also comprises a memory 62 in which is stored data 64 that defines at least some of the zones. For example, the perimeters of zone 1 and zone 2 may be defined with zone 0 being defined, by default, as areas that are not zone 1 or zone 2.

The alert module 20, by comparing the current location L of the alert module 20 determined by the location circuitry 60, with the defined zones, stored in the memory 62, can determine a current state S of the alert module 20. This state S may, for example, correspond to the alert module 20 being located in zone 0, being located in zone 1 or being located in zone 2. The warning signal generator 30 responds to a current state S of the alert module being that it is in zone 2 by producing a warning signal W that is sent to the first entity 40_1 and, optionally, to the second entity 40_2. The warning signal generator 30 responds to a current state S of the alert module 20 being that it is in zone 1 by producing a different warning signal W that is sent to the first entity 40_1 and, optionally, to the second entity 40_2.

The process as described for FIGS. 4 and 5 is performed for both the first alert module 20_1 and, independently, for the second alert module 402 so that there is redundancy.

Thus a first warning signal generator 30 responds to a current state of the first alert module 20_1 being that it is in particular zone (zone 1, zone 2) by producing a particular warning signal W that is sent to the first entity 40_1 and, optionally, to the second entity 40_2. The first warning signal generator 30 may be comprised in the first alert module 20_1.

Thus a second warning signal generator 30 responds to a current state of the second alert module 20_2 being that it is in particular zone (zone 1, zone 2) by producing a particular warning signal W that is sent to the first entity 40_1 and, optionally, to the second entity 40_2. The second warning signal generator 30 may be comprised in the second alert module 20_2.

While FIG. 4 illustrates an example in which absolute location of an alert module 20 relative to two zones is used as a condition for producing warning signals W, it should be appreciated that multiple independent, non-overlapping prohibited geography areas (zone 2) can be defined and none some or all of these can have associated intermediate geographic areas (zone 1).

Figure 6:
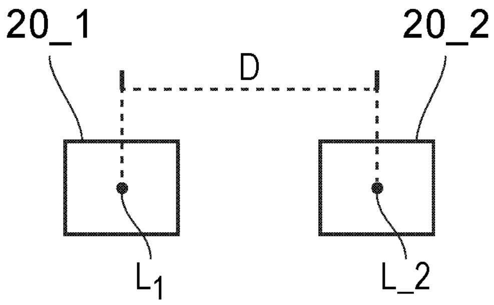
FIG. 6 shows another example embodiment of the subject matter described herein.

FIG. 6 illustrates a scenario in which the condition for producing a warning signal is dependent upon a relative distance or displacement between the first alert module 20_1 and the second alert module 20_2. The first alert module 20_1 has a current location L_1 and the second alert module 20_2 has a current location L_2. The differences between these two locations may be designated a separation distance D. D is a scalar in the following examples but may be a vector in other examples.

When the separation distance D changes, then the warning signal generator 30 is configured to produce a warning signal W. This warning signal W may be provided to the first entity 40_1. In addition, it may optionally be provided to the second entity 40_2.

Figure 7:
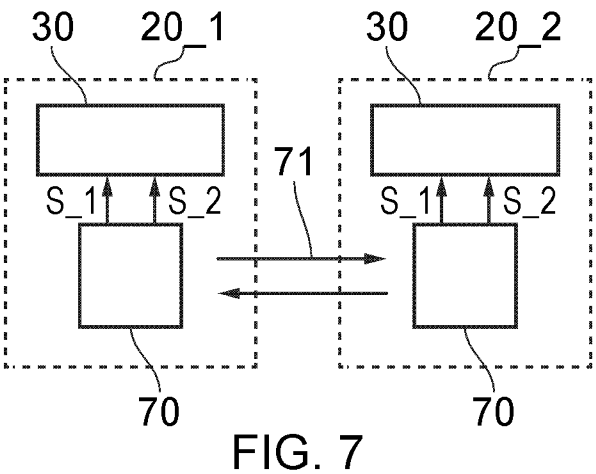
FIG. 7 shows another example embodiment of the subject matter described herein.

FIG. 7 illustrates an example in which the first alert module 20_1 and the second alert module 20_2 communicate directly with each other. Each of the first alert module 20_1 and the second alert module 20_2 comprise transceiver circuitry 70 for bidirectional communication 71 between the alert modules. This bidirectional communication enables the first alert module 201 to confirm the existence of the second alert module 20_2 and furthermore to estimate a distance between the first alert module 20_1 and the second alert module 20_2. The bidirectional communication enables the second alert module 20_2 to confirm the existence of the first alert module 20_1 and furthermore to estimate a distance between the first alert module 20_1 and the second alert module 20_2.

There is therefore bidirectional monitoring.

A current state S_1 of the first alert module 20_1 and a current state S_2 of the second alert module 20_2 can both be determined at the first alert module 20_1 and can both be determined at the second alert module 20_2.

The monitoring may, for example, be achieved by intermittent or periodic transmission of detection signals by the alert module 20 and the reception of those detection signals by the other alert module 20. By measuring attenuation in the detection signals and/or changes in time of flight of the detection signals it is possible to detect a change in separation distance D between the first alert module 20_1 and the second alert module 20_2.

The monitoring may, for example, be achieved by intermittent or periodic transmission of detection signals by the first alert module 20_1 and the reception of those detection signals by the second alert module 20_2 and by intermittent or periodic transmission of detection signals by the second alert module 20_2 and the reception of those signals by the first alert module 201.

The first alert module 20_1 informs the warning signal generator 30 when it has detected that there has been a change in the separation distance D between the first alert module 20_1 and the second alert module 20_2. This may occur because, for example, the second alert module 20_2 has been destroyed and is therefore no longer transmitting or because the distance D between the first alert module 20_1 and the second alert module 20_2 has changed. In response to this current state S, the warning signal generator 30 generates a warning signal dependent on that current state and sends that warning single to at least the first entity 40_1.

The second alert module 20_2 informs the warning signal generator 30 when it has detected that there has been a change in the separation distance between the first alert module 20_1 and the second alert module 20_2. This may occur because, for example, the first alert module 20_1 has been destroyed and is therefore no longer transmitting or because the distance between the first alert module 20_1 and the second alert module 20_2 has changed. In response to this current state S, the warning signal generator 30 generates a warning signal dependent on that current state and sends that warning single to at least the first entity 40_1.

In this example, the transceiver circuitry 70 provides a current measurement of the transmission channel (e.g. one-way time of flight, return-trip time of flight, attenuation) that is used to determine the distance of the second alert module 20_2 from the first alert module 20_1. If the current measurement differs from a reference value recorded in a memory then the warning signal W is produced. This warning signal W indicates that there has been a loss in communication between the alert modules of the group 22 or there has been a change in their separation distance. It is therefore capable of indicating tampering.

Figure 8:
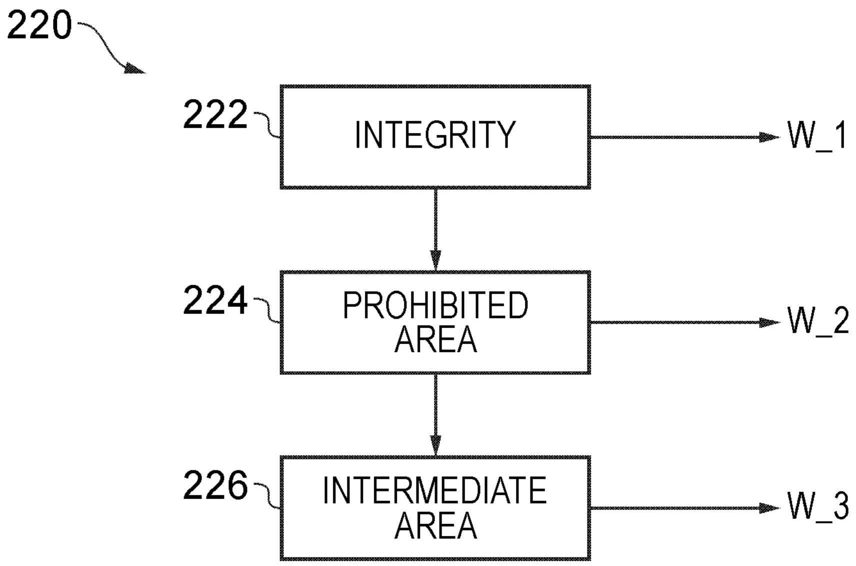
FIG. 8 shows another example embodiment of the subject matter described herein.

As illustrated in FIG. 8, the methodologies as described in relation to FIGS. 4 and 5 (absolute location of an alert module 20 is used as a condition for producing a warning signal W related to a geographic area) can be combined with the methodology illustrated and discussed with relation to FIGS. 6 and 7 (relative location of alert modules 20 in a group 22 is used as a condition for producing a warning signal W related to integrity failure).

It will therefore be appreciated that the apparatus 10 comprises:

means for determining a current location state S_i of at least a first alert module 20_1 and means for determining a current relationship state S_i of a group 22 of alert modules comprising at least the first alert module 20_1 and a second alert module 20_2 of an alert module;

means for providing a warning signal concerning location L_1 of the first alert module 20_1 to a first entity 40_1 in dependence upon the current location state S_i of the first alert module 20_1, means for providing a warning signal to the first entity 40_1 concerning integrity of the group 22 of alert modules in dependence upon a change in a current relationship state S_i of the group 22 of alert modules.

The relationship state is defined by the set of separation distances D between the alert modules 20 in the group.

FIG. 8 illustrates a method 220 which is a more detailed example of the method 200 previously illustrated in FIG. 3.

At block 222 of the method 220, a first condition Cl is used to determine whether there has been integrity failure. This may occur because the separation distance D between the first alert module 20_1 and the second alert module 20_2 has changed or because the alert module 20 that is performing the method 220 can no longer communicate with another alert module of the group 22. The condition is that a change ΔD in the separation distance D is less than some threshold value T. If there is a change ΔD in the separation distance D that is greater than the threshold value T then the first warning signal W_1 is produced and transmitted to the first entity 40_1. Optionally, it may also be transmitted to the second entity 40_2. The first warning signal W_1 is an integrity notification as it indicates that integrity of the system has been compromised either by a failure of one of the alert modules or by a separation of the alert modules.

In some examples the condition may require that a change ΔD in the separation distance D is greater than the threshold during a first threshold period of time.

In some examples the condition may require that a change ΔD in the separation distance D is greater than the threshold, on the average, during a first threshold period of time. e.g.

$$\int_{t_1}^{t_2} \Delta D \cdot dt/(t_2 - t_1) > T$$

In the event that no detection signal, as described with reference to FIG. 7, is received at the alert module performing the method 220 from the other alert module, at an expected time, then the change ΔD in the separation distance D treated as maximal.

If there is no integrity failure, the method 220 proceeds to check, at block 224, for whether or not the alert module 20 has entered a prohibited geographical area (zone 2). In this example the condition that needs to be satisfied to produce the second warning signal W_2 is that the location of the alert module performing the method 220 is within the zone 2. The second warning signal W_2 is sent to the first entity 40_1. It may also optionally be sent to the second entity 40_2. This warning signal indicates that the alert module has entered a prohibited geographic area.

If there is no entry into a prohibited geographic zone, the method 220 proceeds to check, at block 226, for whether or not the alert module 20 has entered an intermediate geographical area (zone 1). In this example the condition that needs to be satisfied to produce the third warning signal W_3 is that the location of the alert module performing the method 220 is within the first zone. The third warning signal W_3 is not sent to the first entity 40_1 but is sent to the second entity 40_2. This warning signal indicates that the alert module has entered an intermediate area adjacent a prohibited geographic area.

The warning signal W_2 is generated in the event that the current state of the alert module performing the method 220 indicates that that alert module is inside a prohibited geographical area (zone 2).

In an example where the method 220 only performs blocks 222, 224 and not block 226, the warning signal W_2 is generated in the event that the current state of the alert module performing the method 220 indicates that that alert module is outside an allowed geographical area (zone 0). The information defining the allowed geographical areas and/or prohibited geographical areas is stored in the alert module.

The method 220 is performed by or for the first alert module 20_1 and, independently by or for the second alert module 20_2.

It will therefore be appreciated that, the apparatus 10 comprises:

means for determining a current location state S_i of a first alert module 20_1 of a group 22 of alert modules and a current location state S_i of a second alert module 20_2 of the group 22 of alert modules;

means for providing a warning signal concerning location L_1 of the first alert module 20_1 to a first entity 40_1 in dependence upon the current location state S_i of the first alert module 201, means for providing a warning signal W_1 to a first entity 40_1 concerning integrity of the apparatus 10 in dependence upon a change in a relationship between the current location state S_i of the first alert module 20_1 and the current location state S_i of the second alert module 202.

Figure 9:
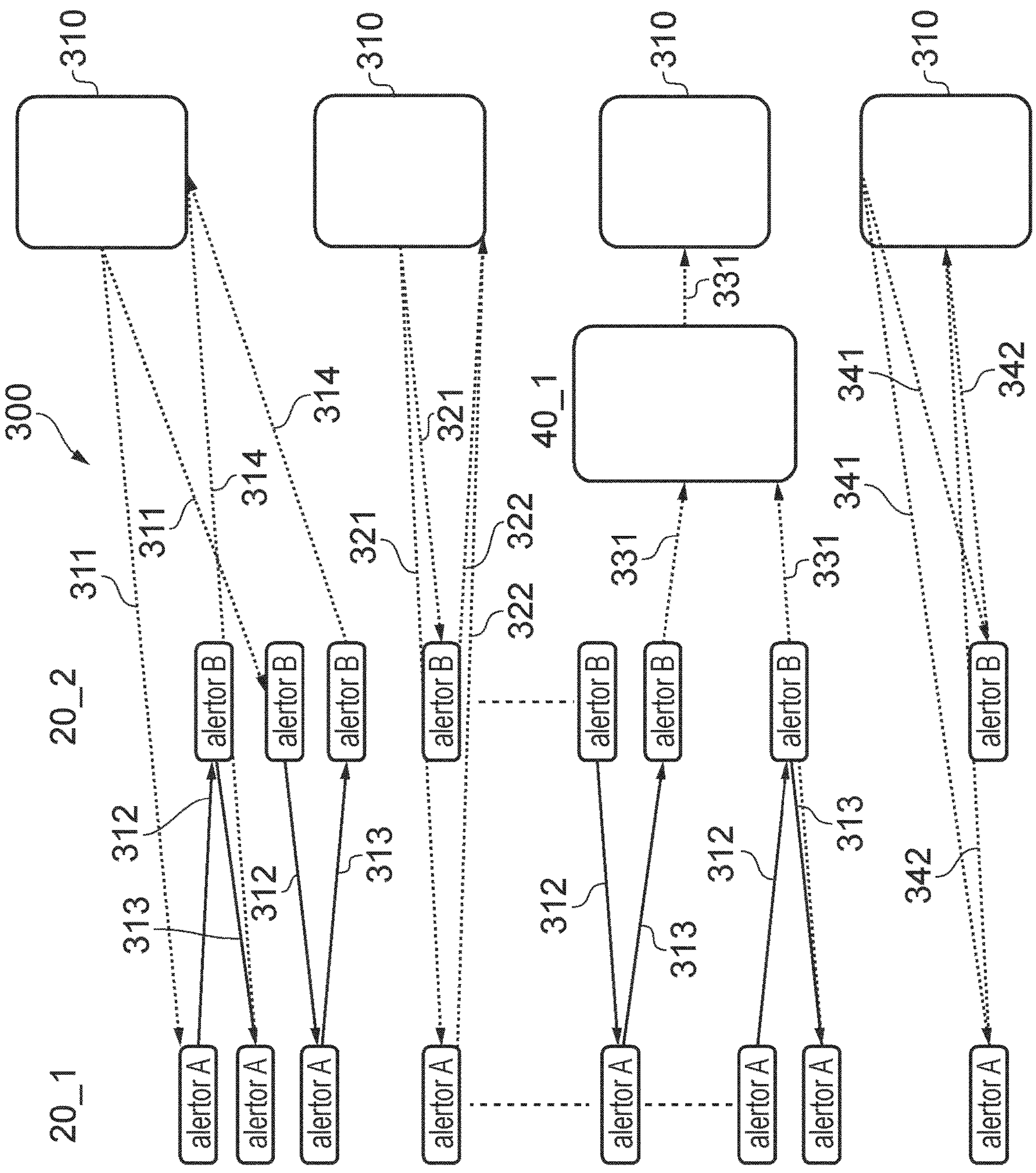
FIG. 9 shows another example embodiment of the subject matter described herein.

The apparatus may additionally comprise means for providing a warning signal W_2, W_3 concerning location L_2 of the second alert module 20_2 to the first entity 40_1 in dependence upon the current location state S_i of the second alert module 20_2, FIG. 9 illustrates an example of a method 300 that is used to monitor the separation distance D between the first alert module 20_1 and the second alert module 20_2 and provide a warning signal W when that separation distance D changes.

The method 300 starts by transmitting a start message 311 to an alert module (origin alert module) from a control 310. In response to receiving the start message 311, the origin alert module transmits a request message 312 from the origin alert module to another alert module or modules (destination alert module(s)). The destination alert module that receives the request message 312 transmits a response message 313 from the destination alert module back to the origin alert module. This response message 313 includes information that is indicative of a time interval T1 between receiving the request message 312 at the destination alert module and transmitting the response message 313 from the destination alert module.

On receiving the response message 313, the origin alert module determines a time interval T2 between transmitting the request message 312 and receiving, in reply, the response message 313.

The origin alert module then transmits a finish message 314 from the origin alert module back to the control 310.

A difference between the time interval T2 and the time interval T1 is calculated (T3=T2−T1) and this is a measure dependent upon a separation distance D between the origin alert module and the destination alert module. This calculation may, in some embodiments, occur at the control 310 in which case the finish message 314 comprises values that indicate the time interval T1 and the time interval T2.

Alternatively, the calculation can occur at the origin alert module, in which case the finish message 314 comprises a value dependent upon the time interval difference T3.

The control 310 may, for example, be the first entity 40_1. However, it may be a different entity.

As illustrated in FIG. 9, initially one of the first alert module 20_1 and the second alert module 20_2 operates as the origin alert module and the other operates as the destination alert module. Subsequently, the process is repeated with the alert module that was originally the destination alert module operating as the origin alert module and the alert module that was originally operating as the origin alert module operating as the destination alert module. Thus, in FIG. 9 initially the origin alert module is the first alert module 20_1 and the destination alert module is the second alert module 20_2 and subsequently the origin alert module is the second alert module 20_2 and the destination alert module is the first alert module 20_1.

Next the monitoring session is started. In some examples, this may occur automatically after the preceding blocks. However, in the example illustrated it is explicitly started using the begin-running message 321. The begin-running message 321 is sent from control 310 to the first alert module 20_1. The first alert module 20_1 responds by sending the begin-running response message 322 from the first alert module 20_1 back to the control 310. A begin-running message 321 is also sent from control 310 to the second alert module 20_2. The second alert module 20_2 responds by sending the begin-running response message 322 from the second alert module 20_2 back to the control 310.

The begin-running message 321 specifies the condition(s) for triggering an alarm which produces a warning signal W.

Next the method 300 performs a series of monitoring sessions. Each monitoring session may be performed intermittently or periodically. The time interval between the sessions may be dependent upon the specific application. In some applications it may be desirable to save energy and have a longer time period between sessions. In other applications it may be desirable to have a shorter time period between sessions so that a warning signal W is produced very shortly after the conditions for such a warning signal are realized.

In a monitoring session, a request message 312 is sent from an origin alert module to a destination alert module or modules. A response message 313 from the destination alert module is sent back to the origin alert module.

The response message 313 includes a time interval T1' that is dependent upon a time interval between receiving the request message 312 at the destination alert module and the transmission of the response message 313 by the origin alert module.

The origin alert module determines a time interval T2' that measures the time interval between transmitting the request message 312 to the destination alert module and receiving, in reply, the response message 313 from the destination alert module. The difference between the time interval T1' and the time interval T2' (T3'=T2'−T1') is calculated as a measure indicative of a current separation distance between the origin alert module and the destination alert module.

If the calculation occurs at the control 310, then the message 331 sent by the origin alert module includes at least the time intervals T1' and T2'. However, if the time interval T3' is calculated at the origin alert module, as illustrated in FIG. 9, then the origin alert module determines whether the current time interval T3' is the same as the original time interval T3. If there is no change, within defined tolerances, then there is no alarm as the condition has not been satisfied.

However, if the current time interval T3' does not equal the original time interval T3 then an alarm condition is created and an alarm message 331 is sent from the origin module to the first entity 40_1 and the control 310 (or other control). As previously described, the alarm message 331 may additionally be sent to the second entity 40_2.

It should be appreciated that this session is repeated intermittently or periodically.

In the example illustrated, there is a first series of monitoring sessions in which the first alert module 20_1 is the origin alert module and the second alert module 20_2 is the destination alert module and the first series is interleaved with a second series of monitoring sessions in which the second alert module 20_2 is the origin alert module and the first alert module 20_1 is the destination alert module.

The method 300 may, optionally, include a process for ending monitoring. A stop measuring message 341 is sent to the respective alert modules 20 from the control 310 (or other control) and the respective alert modules 20 send in reply a stop measuring response message 322 back to the control 310 (or other control).

It will be appreciated that the above method 300 may be varied in various different ways to achieve the overall result, which is calibrating the distance between the first alert module 20_1 and the second alert module 20_2 (that is determining an original value for the separation distance D) and then monitoring the separation distance so that a warning signal W can be produced when it changes. The alarm message 331 is an example of the warning signal W.

In one implementation example of the method of FIG. 9, the start message 311 includes:

- an alerter ID field that indicates the origin alert module;
- a PAIR alerter ID field which indicates the destination alert module(s);
- a transaction ID field which identifies a transaction that involves monitoring of changes in separation distance between the group 22 of alert modules 20 defined by alerter ID and PAIR alerter ID, and an optional field that indicates a rough range of the expected distance between the alert modules.

The request message 312 comprises the alerter ID, the PAIR alerter ID and the transaction ID.

The response message 313 comprises the transaction ID and a time interval field. The time interval field indicates the absolute timing interval between the time when the request message 312 is received and the time when the response message 313 is sent.

The finish message 314 comprises the transaction ID field and a measurement result field. Depending upon implementation, the measurement result field may include the timing interval from when the request message 312 was received to when the measurement response 313 was sent (T1) and the timing interval from when the request message 312 was sent to when the measured response message 313 was received (T2), or the results may send the time interval between these two values T3=T2−T1.

The begin running message 321 comprises the alerter ID, the transaction ID, a set distance field that indicates the threshold distance between the alert modules. If the current distance between the alert modules varies from this reference distance then an alert will be generated.

An optional field, alarm condition, may be used to indicate the condition when the alarm shall be raised. This may, for example, include a requirement for the variation from the threshold distance to be more than a specified amount and/or for more than a specified amount of time. The begin running message 321, in this example, also includes an article ID field that indicates the ID of the article, the apparatus 10, with which the alert modules 20 are associated.

The begin running response message 322 includes the transaction ID field.

The alarm message 331 includes the alerter ID field, the article ID field and an alarm cause field that indicates what has caused the alarm. This message is a warning signal W which is sent to at least the first entity 40_1 and is dependent at least partially on the current state of the first alert module 20_1 and the second alert module 20_2 of the group 22 of alert modules. The current state S_1 of the first alert module 20_1 (which is dependent upon a current location L_1 of the first alert module 20_1) and the current state S_2 of the second alert module 20-2 (which is dependent upon a current location L_2 of the second alert module 20_2) indicates a change in separation distance between the first alert module 20_1 and the second alert module 20_2, and this change in separation distance D triggers transmission of the warning signal W to the first entity 40_1.

The stop measuring message 341 includes the alerter ID and the transaction ID. The stop measuring response message 342 includes the transaction ID.

Figure 10:
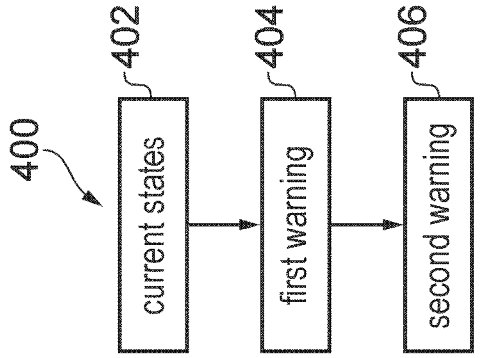
FIG. 10 shows another example embodiment of the subject matter described herein.

FIG. 10 illustrates a generalized method 400 that captures the operation of the preceding described examples. The method 400 comprises, at block 402, determining a current state S_i of each of a first alert module 20_1 and a second alert module 20_2 of a group 22 of alert modules, wherein a current state S_1 of the first alert module 20_1 is dependent upon at least a current location L_1 of the first alert module 20_1 and a current state S_2 of the second alert module 20_2 is dependent upon at least a current location L_2 of the second alert module 202.

Next, at block 404, the method 400 comprises providing a first warning signal W_1 to a first entity 40_1 dependent at least partially on the current state S_i of the first alert module 20_1 and/or the second alert module 20_2 of the group 22 of alert modules.

The method 400 also comprises, at block 406, providing a second warning signal W_2 to the first entity 40_1 and/or a second entity 40_2 dependent at least partially on the current state S_i of the first alert module 20_1 and with the second alert module 20_2 of the group 22 of alert modules.

Figure 11:
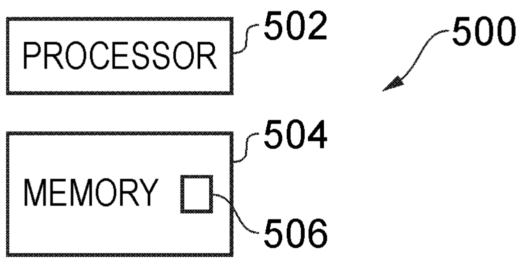
FIG. 11 shows another example embodiment of the subject matter described herein.

FIG. 11 illustrates an example of a controller 500 that can be used provide processing functionality within an alert module 20, a warning signal generator 30 or an entity 40. Implementation of a controller 500 may be as controller circuitry. The controller 500 may be implemented in hardware alone, have certain aspects in software including firmware alone or can be a combination of hardware and software (including firmware).

As illustrated in FIG. 11 the controller 500 may be implemented using instructions that enable hardware functionality, for example, by using executable instructions of a computer program 506 in a general-purpose or special-purpose processor 502 that may be stored on a computer readable storage medium (disk, memory etc) to be executed by such a processor 502.

The processor 502 is configured to read from and write to the memory 504. The processor 502 may also comprise an output interface via which data and/or commands are output by the processor 502 and an input interface via which data and/or commands are input to the processor 502.

The memory 504 stores a computer program 506 comprising computer program instructions (computer program code) that controls the operation of the apparatus 10 when loaded into the processor 502. The computer program instructions, of the computer program 506, provide the logic and routines that enables the apparatus to perform the methods illustrated in FIG. 10. The processor 502 by reading the memory 504 is able to load and execute the computer program 506.

The apparatus 10 can therefore comprise:

at least one processor 502; and at least one memory 504 including computer program code the at least one memory 504 and the computer program code configured to, with the at least one processor 502, cause the apparatus 10 at least to perform:

determining a current state S_i of each of a first alert module 20_1 and a second alert module 20_2 of a group 22 of alert modules, wherein a current state S_1 of the first alert module 20_1 is dependent upon at least a current location L_1 of the first alert module 20_1 and a current state S_2 of the second alert module 20_2 is dependent upon at least a current location L_2 of the second alert module 20_2;

providing a first warning signal W_1 to a first entity 40_1 dependent at least partially on the current state S_i of the first alert module 20_1 and/or the second alert module 20_2 of the group 22 of alert modules; and providing a second warning signal W_2 to the first entity 40_1 and/or a second entity 40_2 dependent at least partially on the current state S_i of the first alert module 20_1 and with the second alert module 20_2 of the group 22 of alert modules.

Figure 12:
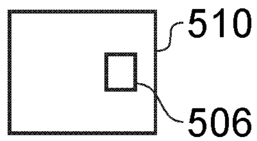
FIG. 12 shows another example embodiment of the subject matter described herein.

As illustrated in FIG. 12, the computer program 506 may arrive at the apparatus 10 via any suitable delivery mechanism 510. The delivery mechanism 510 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 506. The delivery mechanism may be a signal configured to reliably transfer the computer program 506. The apparatus 10 may propagate or transmit the computer program 506 as a computer data signal.

Computer program instructions for causing an apparatus to perform at least the following or for performing at least the following:

determining a current state S_i of each of a first alert module 20_1 and a second alert module 20_2 of a group 22 of alert modules, wherein a current state S_1 of the first alert module 20_1 is dependent upon at least a current location L_1 of the first alert module 20_1 and a current state S_2 of the second alert module 20_2 is dependent upon at least a current location L_2 of the second alert module 20_2;

providing a first warning signal W_1 to a first entity 40_1 dependent at least partially on the current state S_i of the first alert module 20_1 and/or the second alert module 20_2 of the group 22 of alert modules; and providing a second warning signal W_2 to the first entity 40_1 and/or a second entity 40_2 dependent at least partially on the current state S_i of the first alert module 20_1 and with the second alert module 20_2 of the group 22 of alert modules.

The computer program instructions may be comprised in a computer program, a non-transitory computer readable medium, a computer program product, a machine readable medium. In some but not necessarily all examples, the computer program instructions may be distributed over more than one computer program.

Although the memory 504 is illustrated as a single component/circuitry it may be implemented as one or more separate components/circuitry some or all of which may be integrated/removable and/or may provide permanent/semi-permanent/dynamic/cached storage.

Although the processor 502 is illustrated as a single component/circuitry it may be implemented as one or more separate components/circuitry some or all of which may be integrated/removable. The processor 502 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 13:
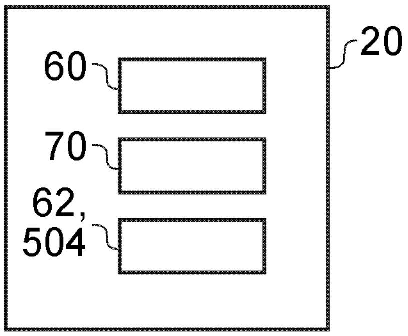
FIG. 13 shows another example embodiment of the subject matter described herein.

FIG. 13 is a schematic illustration of an example of an alert module 20. The alert module 20 comprises transceiver circuitry 70, location circuitry 60 and a memory. The location circuitry 60 operates with the memory as described in relation to FIGS. 4 and 5. The transceiver circuitry 70 operates with the memory as described with reference to FIGS. 6 and 7. Aspects of the transceiver circuitry 70, location circuitry 60 and the memory, may be provided by a controller 500.

The transceiver circuitry 70 enables the alert module 20 to communicate with other alert modules 20 and other entities 40. The location circuitry 60 enables the alert module 30 to determine its absolute position using for example satellite positioning and to also determine its relative location compared to another alert module. This may be achieved as described, for example in FIG. 9 or by other mechanisms, for examples using RFID tags or, WiMax tags or Bluetooth.

Figure 14:
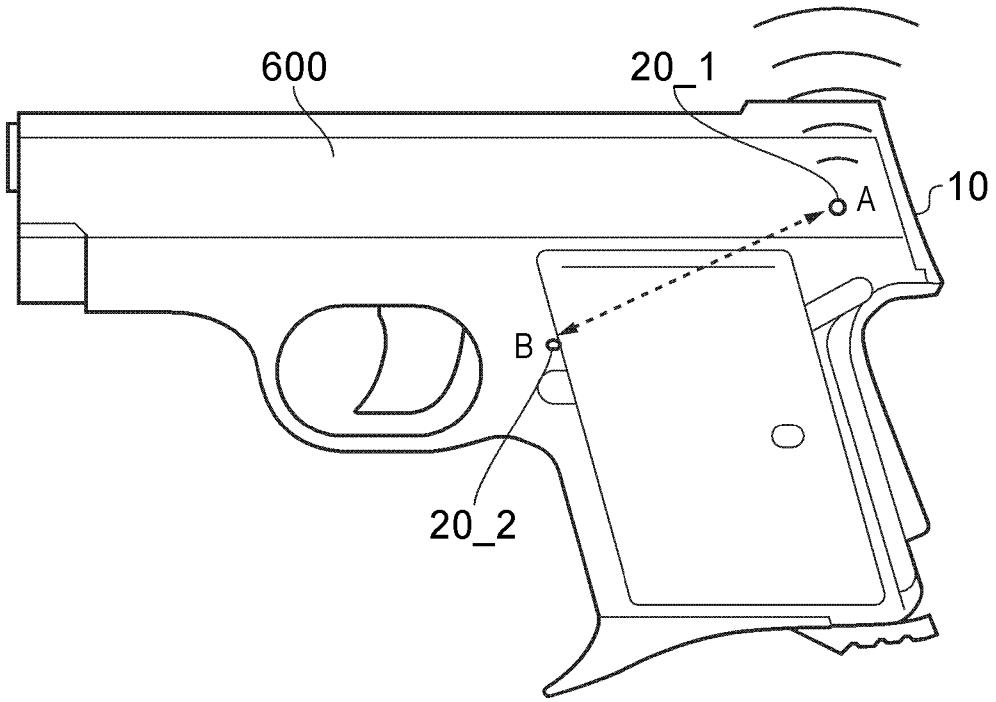
FIG. 14 shows another example embodiment of the subject matter described herein.

FIG. 14 illustrates an example in which the apparatus 10 is embodied as a gun, for example a handgun 600. The first alert module 20_1 and the second alert module 20_2 are embedded into different parts of the handgun 600. In accordance with the above described methods, if the handgun 600 is brought towards a restricted geographical area, an initial warning signal will be sent only to the owner/keeper of the handgun 600. If the handgun 600 then travels into the restricted area, a warning signal will be sent to a public security control authority 40_1 and, optionally, also to the owner/keeper 40_2 of the gun 600. Tampering with this process is prevented or discouraged by the presence of two or more alert modules 20 that are in bidirectional communication. If either one of the alert modules 20 becomes inactive, for example via deliberate damage, the other of the alert modules 20 will send a warning signal to the public security control authority 40_1 and/or the owner of the gun 40_2.

As an additional enhancement that frustrates the simultaneous destruction of multiple alert modules 20, in this or other examples, the public security control authority 40_1 2 may periodically poll one or more of the alert modules 20 of the group 22 to obtain a response message. The absence of a response message may be used to indicate tampering with the apparatus 10.

Figure 15:
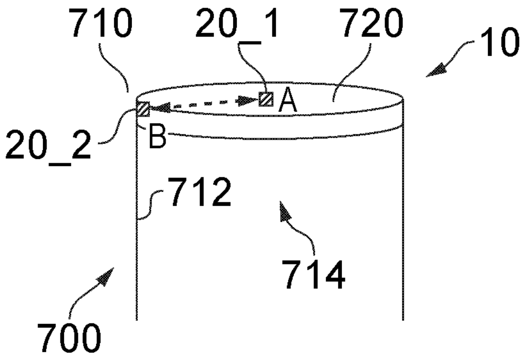
FIG. 15 shows another example embodiment of the subject matter described herein.

FIG. 15 illustrates another example of the apparatus 10. In this example, the apparatus 10 is a manhole 700 comprising a manhole aperture arrangement 710 and a manhole cover 720. A manhole is an inspection opening or access opening. In this example, one alert module 20, that operates as the first alert module 20_1, may be placed at a fixed position of the cover 720 and another alert module 20, that operates as the second alert module 20_2, is placed at a fixed position at a perimeter edge 712 of the aperture 714 of the aperture arrangement 710. Thus, the first alert module 20_1 and the second alert module 20_2 may have a defined distance when the cover 710 is correctly placed on the aperture arrangement 720. In some examples the first alert module 20_1 and the second alert module 20_2 may oppose each other across a small gap between the cover 710 and the aperture arrangement 720. It is possible to detect the removal of the manhole cover 710 from the aperture arrangement 720 and it is also possible to track a location of the manhole cover 710 when removed.

Where a structural feature has been described, it may be replaced by means for performing one or more of the functions of the structural feature whether that function or those functions are explicitly or implicitly described.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIG. 10 may represent steps in a method and/or sections of code in the computer program 506. The illustration of a particular order to the blocks does not necessarily imply that there is a required or preferred order for the blocks and the order and arrangement of the block may be varied. Furthermore, it may be possible for some blocks to be omitted.

In some but not necessarily all examples, the apparatus 10 is configured to communicate data from/to the apparatus 10 with or without local storage of the data in a memory at the apparatus 10 and with or without local processing of the data by circuitry or processors at the apparatus 10.

The data may be stored in processed or unprocessed format remotely at one or more devices. The data may be stored in the Cloud.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over cellular radio links. The apparatus may comprise a communications interface such as, for example, a radio transceiver for communication of data.

The apparatus 10 may be part of the Internet of Things forming part of a larger, distributed network.

The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the apparatus 10 where it may produce an output sensible to the subject such as an audio output, visual output or haptic output.

The recording of data may comprise only temporary recording, or it may comprise permanent recording or it may comprise both temporary recording and permanent recording, Temporary recording implies the recording of data temporarily. This may, for example, occur during sensing or image capture, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature) or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising at least one processor; and at least one memory including computer program code, the at least one memory and the computer program code configured, with the at least one processor, to cause the apparatus to perform:

determine a current location of a first alert module which determines a dependency between at least the current location of the first alert module and a current location of a second alert module;

provide a first warning signal to a first entity based at least in part on the dependency which provides a first condition, wherein the first entity (i) comprises a processor, (ii) is different from the first alert module and the second alert module, and (iii) is independent from the first alert module and the second alert module;

provide a second warning signal to the first entity based at least in part on the dependency which provides a second condition; and cause one of the first and second alert modules to send a warning signal in an instance in which another of the first and second alert modules becomes inactive.

2. An apparatus as claimed in claim 1, wherein the first condition is dependent upon the first and second alert modules being within an allowed location.

3. An apparatus as claimed in claim 1, wherein the second condition is dependent upon the first and second alert modules being within a prohibited location.

4. An apparatus as claimed in claim 1, wherein the first and second alert modules are placed at fixed positions on a cover and a perimeter edge of an opening, respectively, so as to be spaced apart by a predefined distance in an instance in which the cover is placed on the opening.

5. An apparatus as claimed in claim 1, wherein the first and second alert modules are placed at fixed positions on a cover and a perimeter edge of an opening, respectively, so as to oppose one another across a gap between the cover and the perimeter edge of the opening.

6. An apparatus as claimed in claim 1, wherein the first and second alert modules are placed at fixed positions on a cover and a perimeter edge of an opening, respectively, and wherein the apparatus is further caused to detect removal of the cover from the opening based upon the dependency determined between the first and second alert modules.

7. An apparatus as claimed in claim 1, wherein the apparatus is further caused to provide for bidirectional communication between the first and second alert modules.

8. An apparatus as claimed in claim 1, wherein the apparatus is further caused to poll one or more the first and second alert modules to obtain a response message.

9. A method comprising:

determining a current location of a first alert module which determines a dependency between at least the current location of the first alert module and a current location of a second alert module;

providing a first warning signal to a first entity based at least in part on the dependency which provides a first condition, wherein the first entity (i) comprises a processor, (ii) is different from the first alert module and the second alert module, and (iii) is independent from the first alert module and the second alert module;

providing a second warning signal to the first entity based at least in part on the dependency which provides a second condition; and causing one of the first and second alert modules to send a warning signal in an instance in which another of the first and second alert modules becomes inactive.

10. A method as claimed in claim 9, wherein the first condition is dependent upon the first and second alert modules being within an allowed location.

11. A method as claimed in claim 9, wherein the second condition is dependent upon the first and second alert modules being within a prohibited location.

12. A method as claimed in claim 9, wherein the first and second alert modules are placed at fixed positions on a cover and a perimeter edge of an opening, respectively, so as to be spaced apart by a predefined distance in an instance in which the cover is placed on the opening.

13. A method as claimed in claim 9, wherein the first and second alert modules are placed at fixed positions on a cover and a perimeter edge of an opening, respectively, so as to oppose one another across a gap between the cover and the perimeter edge of the opening.

14. A method as claimed in claim 9, wherein the first and second alert modules are placed at fixed positions on a cover and a perimeter edge of an opening, respectively, and wherein the method further comprises detecting removal of the cover from the opening based upon the dependency determined between the first and second alert modules.

15. A method as claimed in claim 9, further comprising providing for bidirectional communication between the first and second alert modules.

16. A method as claimed in claim 9, further comprising polling one or more the first and second alert modules to obtain a response message.

17. A computer program product comprising at least one non-transitory computer-readable storage medium having computer-executable program code portions stored therein, the computer-executable program code portions comprising program code instructions configured to:

determine a current location of a first alert module which determines a dependency between at least the current location of the first alert module and a current location of a second alert module;

provide a first warning signal to a first entity based at least in part on the dependency which provides a first condition, wherein the first entity (i) comprises a processor, (ii) is different from the first alert module and the second alert module, and (iii) is independent from the first alert module and the second alert module;

provide a second warning signal to the first entity based at least in part on the dependency which provides a second condition; and cause one of the first and second alert modules to send a warning signal in an instance in which another of the first and second alert modules becomes inactive.

18. A computer program product as claimed in claim 17, wherein the first condition is dependent upon the first and second alert modules being within an allowed location, and wherein the second condition is dependent upon the first and second alert modules being within a prohibited location.

* * * * *